United States Patent
Wang et al.

(10) Patent No.: US 10,111,248 B2
(45) Date of Patent: Oct. 23, 2018

(54) METHOD AND SYSTEM FOR CROSS-SUBFRAME SCHEDULING DURING CARRIER AGGREGATION

(75) Inventors: Yiping Wang, Allen, TX (US); Jun Li, Richardson, TX (US); Jianfeng Weng, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 872 days.

(21) Appl. No.: 13/538,761

(22) Filed: Jun. 29, 2012

(65) Prior Publication Data

US 2014/0003356 A1    Jan. 2, 2014

(51) Int. Cl.
*H04W 72/12* (2009.01)
*H04L 5/00* (2006.01)

(52) U.S. Cl.
CPC ......... *H04W 72/1289* (2013.01); *H04L 5/001* (2013.01)

(58) Field of Classification Search
None
See application file for complete search history.

(56) References Cited

U.S. PATENT DOCUMENTS

| | | | | |
|---|---|---|---|---|
| 8,837,526 B2 * | 9/2014 | Li | | 370/482 |
| 8,902,828 B2 * | 12/2014 | Prakash et al. | | 370/329 |
| 9,054,843 B2 * | 6/2015 | Frederiksen | | H04L 5/0053 |
| 2011/0105050 A1 * | 5/2011 | Khandekar et al. | | 455/68 |
| 2011/0228724 A1 * | 9/2011 | Gaal | | H04L 5/001 370/328 |
| 2013/0182654 A1 * | 7/2013 | Hariharan | | H04W 52/54 370/329 |
| 2013/0194931 A1 * | 8/2013 | Lee et al. | | 370/241 |
| 2014/0105155 A1 * | 4/2014 | Kim et al. | | 370/329 |

FOREIGN PATENT DOCUMENTS

| | | | | |
|---|---|---|---|---|
| EP | 2680654 A1 * | 1/2014 | | H04W 72/12 |
| WO | 2011053990 | 5/2011 | | |

OTHER PUBLICATIONS

International Searching Authority, "PCT Invitation to Pay Additional Fees and Partial International Search Report," issued in connection with international application No. PCT/US2013/046255, dated Nov. 14, 2013 (7 pages).

3GPP TSG RAN WG1 Meeting #69, NTT DOCOMO, "PDCCH Enhancement for Different TDD UL-DL Configuration on Different Bands," R1-121973, Prague, Czech Republic, May 21-25, 2012 (6 pages).

(Continued)

*Primary Examiner* — Nicholas Sloms
(74) *Attorney, Agent, or Firm* — Fish & Richardson P.C.

(57) ABSTRACT

A method and user equipment for cross-subframe scheduling at a user equipment, the method receiving an indication for scheduling a subframe; mapping the indication to the subframe; and detecting the subframe on a frequency at a time associated with the subframe. Further, a method and apparatus of cross-carrier scheduling, the method obtaining an indication that at least one downlink subframe on at least one secondary carrier is not scheduled by a primary carrier; and scanning the at least one secondary carrier for scheduling information for the at least one downlink subframe.

8 Claims, 10 Drawing Sheets

(56) References Cited

OTHER PUBLICATIONS

3GPP TSG RAN WG1 Meeting #69, Qualcomm Incorporated, "Support of CA for different TDD UL-DL configurations," R1-122766, Prague, Czech Republic, May 21-25, 2012 (6 pages).
International Searching Authority, "International Search Report and Written Opinion of the International Searching Authority," issued in connection with international application No. PCT/US2013/046255, dated Jan. 30, 2014 (20 pages).
Taiwan Intellectual Patent Office, "Office Action," issued in connection with Taiwan Application No. 102117086 dated Oct. 27, 2014, 8 pages, in Chinese language with English translation.
Patent Cooperation Treaty, "International Preliminary Report on Patentability," issued by the International Searching Authority in connection with PCT application No. PCT/US2013/046225, dated Dec. 31, 2014 (13 pages).
3GPP TS 136 211 V10.4.0: "Evolved Universal Terrestrial Radio Access (E-UTRA); Physical Channels and Modulation", Jan. 2012, 103 pages.
3GPP TS 136 213 V10.5.0: "Evolved Universal Terrestrial Radio Access (E-UTRA); Physical layer procedures", Mar. 2012, 127 pages.
3GPP TS 136 212 V10.5.0: "Evolved Universal Terrestrial Radio Access (E-UTRA); Multiplexing and channel coding", Mar. 2012, 81 pages.
MCC Support, "Final Report of 3GPP TSG RAN WG1 #66 v1.0.0, Athens, Greece, Aug. 22-26, 2011", 3GPP TSG RAN WG1 Meeting #66bis, R1-112886, Zhuhai, China, Oct. 10-14, 2011, 105 pages.
MCC Support, "Final Report of 3GPP TSG RAN WG1 #66bis v1.0.0, (Zhuhai, P. R. China, Oct. 10-14, 2011)", 3GPP TSG RAN WG1 Meeting #67, R1-114352, San Francisco, USA, Nov. 14-18, 2011, 85 pages.
MCC Support, "Final Report of 3GPP TSG RAN WG1 #67 v1.0.0, (San Francisco, CA, USA, Nov. 14-18, 2011)", 3GPP TSG RAN WG1 Meeting #68, R1-120001, Dresden, Germany, Feb. 6-10, 2012, 90 pages.
MCC Support, "Final Report of 3GPP TSG RAN WG1 #68 v1.0.0, (Dresden, Germany, Feb. 6-10, 2012)", 3GPP TSG RAN WG1 Meeting #68bis, R1-120951, Jeju, South Korea, Mar. 26-30, 2012, 95 pages.
MCC Support, "Draft Report of 3GPP TSG RAN WG1 #68bis v0.1.0, Jeju, South Korea, Mar. 26-30, 2012)", 3GPP TSG RAN WG1 Meeting #69, R1-12xxxx, Prague, Czech Republic, May 21-25, 2012, 104 pages.
Research in Motion, UK Limited, "Design of HARQ and Scheduling Timing Linkage to Support Inter-band CA with Different TDD Configurations", 3GPP TSG RAN WG1 Meeting #68, R1-120336, Agenda Item 7.2.1.5, Dresden, Germany, Feb. 6-10, 2012, 5 pages.
Communication Pursuant to Article 94(3) EPC issued in EP Application No. 131513616 on Dec. 9, 2015; 7 pages.
Qualcomm Incorporated, "Further Details on Search Space and Blind Decodes for CA"; 3GPP TSG RAN WG1 #62; R1-104780; Aug. 23-27, 2010, Madrid, Spain; 4 pages.

\* cited by examiner

METHOD AND SYSTEM FOR CROSS-SUBFRAME SCHEDULING DURING CARRIER AGGREGATION

FIELD OF THE DISCLOSURE

The present disclosure relates to carrier aggregation in mobile networks and in particular relates to cross-subframe scheduling during carrier aggregation in a mobile network.

BACKGROUND

In a mobile network, various component carriers may be used by a plurality of mobile devices. During carrier aggregation, a single user equipment (UE) may receive and/or send over a plurality of component carriers. The scheduling of information on the plurality of component carriers may be, in some cases, performed using a scheduling carrier referred to as a primary carrier. Component carriers other than the scheduling carrier are referred to as scheduled carriers, which in some cases are referred to as secondary carriers. Thus, a UE will receive an indication on the scheduling carrier that it should detect a subframe on a scheduled carrier, for example.

When a primary (scheduling) carrier and a secondary (scheduled) carrier have similar subframes allocated to downlink or uplink transmissions, the scheduling of the secondary carrier from the primary carrier is relatively straightforward. Specifically, since both the primary and secondary carriers have identical downlink subframes, a downlink subframe at the primary carrier can be used to allocate resources on a simultaneous downlink resource on the secondary carrier.

However, if the component carriers are configured differently, that is the component carriers have different subframes allocated to downlink than other component carriers, the degree of complexity with regard to scheduling the secondary carrier increases. For example, a secondary carrier may have more downlink subframes which need to be scheduled than the number of downlink subframes at the primary carrier.

BRIEF DESCRIPTION OF THE DRAWINGS

The present disclosure will be better understood with reference to the drawings, in which.

DETAILED DESCRIPTION OF THE DRAWINGS

The present disclosure provides a method for cross-subframe scheduling at a user equipment comprising: receiving, at the user equipment, an indication for scheduling a subframe; mapping the indication to the subframe; and detecting the subframe on a frequency at a time associated with the subframe.

The present disclosure further provides a user equipment comprising: a processor; and a communications subsystem, wherein the processor and communications subsystem are configured to: receive an indication for scheduling a subframe; map the indication to the subframe; and detect the subframe on a frequency at a time associated with the subframe.

The present disclosure further provides a method of cross-carrier scheduling at a user equipment comprising: obtaining, at the user equipment, an indication that at least one downlink subframe on at least one secondary carrier is not scheduled by a primary carrier; and scanning, from the user equipment, the at least one secondary carrier for scheduling information for the at least one downlink subframe.

The present disclosure further provides a user equipment comprising: a processor; and a communications subsystem, wherein the processor and communications subsystem are configured to: obtain an indication that at least one downlink subframe on at least one secondary carrier is not scheduled by a primary carrier; and scan the at least one secondary carrier for scheduling information for the at least one downlink subframe.

The present disclosure is described below with regard to the 3$^{rd}$ Generation Partnership Project (3GPP) Evolved Universal Terrestrial Radio Access (E-UTRA), also known as Long Term Evolution (LTE), in time division duplex (TDD) mode. However, this is not meant to be limiting and the method and systems of the present disclosure can equally be used with other communications systems that support carrier aggregation, and can further be utilized in frequency division duplex (FDD) mode of the LTE systems. The embodiments below are therefore merely examples and the methods and systems described herein could be extended to other technologies.

Figure 1:
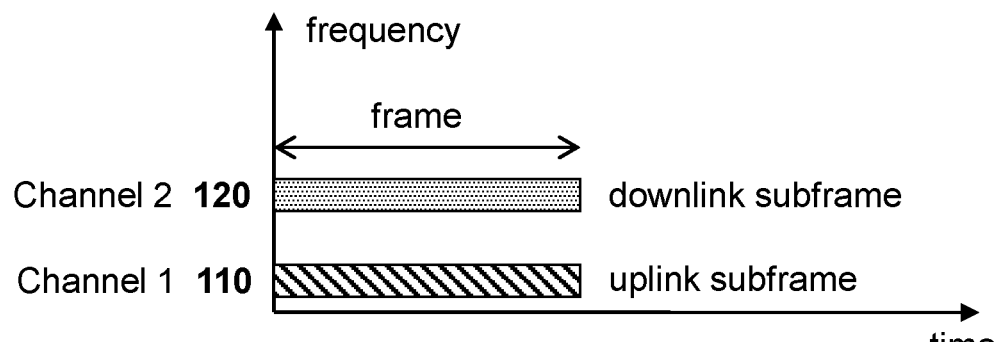
FIG. 1 is a block diagram showing uplink and downlink subframes for frequency division duplex.

In a 3GPP LTE system, downlink and uplink transmissions are organized into one of two duplex modes. These are referred to as a frequency division duplex (FDD) mode and a time division duplex (TDD) mode. The FDD mode uses paired spectrum to separate the uplink (UL) and downlink (DL) transmissions. For example, reference is now made to FIG. 1 which shows a first channel 110 which provides an uplink subframe and a second channel 120 which provides the downlink subframe. A frame as shown in FIG. 1 contains a plurality of subframes. Each of channels 110 and 120 uses a separate carrier frequency.

Figure 2:
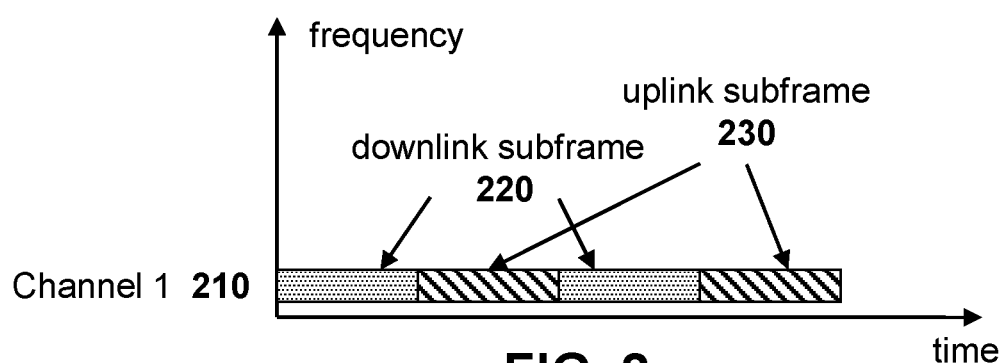
FIG. 2 is a block diagram showing uplink and downlink subframes for time division duplex.

In TDD systems, unpaired spectrum is used when both UL and DL are transmitted using the same carrier frequency. The UL and DL are separated in the time domain. Reference is now made to FIG. 2, which shows a channel 210 having downlink subframes 220 interspersed with uplink subframes 230.

In a 3GPP LTE TDD system, a subframe of a radio frame can be a downlink, an uplink, or a special subframe. The special subframe comprises downlink and uplink time regions separated by a guard period for the downlink to uplink switching. In the 3GPP Technical Specification (TS) 36.211, *"Evolved Universal Terrestrial Radio Access (E-UTRA); Physical Channels and Modulation"*, V10.4.0, Dec. 22, 2011, the contents of which are incorporated herein by reference, seven different uplink/downlink configuration schemes are defined for LTE TDD operations. These are provided below with regard to Table 1, where a "D" represents a downlink subframe, a "U" represents an uplink subframe, and an "S" represents a special subframe.

TABLE 1

LTE TDD Uplink-downlink Configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the Table 1 above, the special subframe includes three parts. They are the downlink pilot time slot (DwPTS), the uplink pilot time slot (UpPTS) and a guard period (GP). Downlink transmissions on the physical downlink shared channel (PDSCH) may be made in downlink subframes or in DwPTS portions of special subframes.

As Table 1 shows, two switching point periodicities are specified in the LTE standard. They are 5 ms and 10 ms. A 5 ms switching point periodicity supports the co-existence between LTE and low chip rate Universal Terrestrial Radio Access (UTRA) TDD systems. A 10 ms switching point periodicity is for the coexistence between LTE and a high chip rate UTRA TDD system.

From Table 1, supported configurations cover a wide range of uplink and downlink allocations and can range from a downlink heavy 1:9 ratio to an uplink heavy 3:2 ratio. The downlink allocations in the ratios include both the downlink subframes and the special subframes which can also carry downlink transmissions in DwPTS portions.

Compared to FDD systems, TDD systems have more flexibility in terms of the proportion of resources assigned to uplink and downlink communications within a given assignment of spectrum. Specifically, it is possible to distribute radio resources unevenly between uplink and downlink. Radio resources can thus be utilized more efficiently by selecting an appropriate uplink/downlink configuration based on an interference situation and different traffic characteristics both in the uplink and downlink.

Since uplink and downlink transmissions are not continuous in LTE TDD systems, scheduling of the various subframes and hybrid acknowledgement repeat request (HARQ) timing needs to be specified. Uplink or downlink transmissions do not occur in every subframe, and the data channel transmissions with their scheduling grant and HARQ timing relationships are separately defined in the 3GPP specifications.

HARQ ACK/NACK timing relationships for downlink data channel transmission are defined in Table 2 below, which shows index set K as defined in Table 10.1.3.1-1 of the 3GPP TS 36.213, *"Evolved Universal Terrestrial Radio Access (E-UTRA); Physical Layer Procedures"*, V10.5.0, Mar. 13, 2012, the contents of which are incorporated herein by reference.

As seen in Table 2, the HARQ ACK/NACK transmission from a user equipment (UE) in subframe n is associated with the DL PDSCH transmission from the evolved node B (eNB) in subframes n−k, where k∈K with K={$k_m$, m=0 to M−1} being a set of M elements.

TABLE 2

Index set K: {$k_0, k_1, \ldots$ for DL HARQ association

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | — | 7 |

Thus, as seen from the first row of Table 2, the uplink/downlink configuration is configuration 0. In this configuration, the first uplink subframe is in subframe 2. Thus, in column for subframe 2 the numeral "6" indicates that the ACK/NACK is being sent from the UE in uplink subframe n (n=2) and it is for the downlink transmission from the eNB in downlink subframe n−6, i.e., 6 subframes previous to the uplink subframe n.

Similarly, for uplink transmissions, the HARQ ACK/NACK is transmitted from the eNB and is received at a UE. Reference is now made to Table 3, which shows index k as a timing linkage between the ACK/NACK received by the UE in subframe i and the physical uplink shared channel (PUSCH) transmission that occurred in the subframe i−k. Table 3 represents Table 8.3-1 of the 3GPP TS 36.213.

TABLE 3

Index k for uplink HARQ association

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 or 6 | 4 | | | | 7 or 6 | 4 | | | |
| 1 | | 4 | | | 6 | | | 4 | | 6 |
| 2 | | | | 6 | | | | | 6 | |
| 3 | 6 | | | | | | | | 6 | 6 |

TABLE 3-continued

| TDD UL/DL Configuration | \multicolumn{10}{c}{Index k for uplink HARQ association subframe number i} |

| TDD UL/DL Configuration | 0 | 1 | 2 | 3 | 4 | 5 | 6 | 7 | 8 | 9 |
|---|---|---|---|---|---|---|---|---|---|---|
| 4 |   |   |   |   |   |   |   |   | 6 | 6 |
| 5 |   |   |   |   |   |   |   | 6 |   |   |
| 6 | 6 | 4 |   |   |   | 7 | 4 |   |   | 6 |

Table 3 indicates the physical HARQ indicator channel (PHICH) carrying the ACK/NACK received by the UE in downlink subframe i is linked with the uplink data transmission from the UE in uplink subframe i−k, where k is given in Table 3.

For uplink/downlink configuration 0, in subframes 0 and 5, if a PHICH indicator $I_{PHICH}=1$, then k=6, otherwise k=7. This is because there may be two sets of ACK/NACKs for a UE transmitting on the PHICH in subframes 0 and 5.

The relationship between an uplink data transmission/ retransmission at a UE in response to an uplink grant or to a HARQ ACK/NACK from the eNB to the UE is provided with regard to Table 4 below, which represents Table 8.2 of the 3GPP TS 36.213 specification. With regard to Table 4, the UE, upon detection of a physical downlink control channel (PDCCH) with a downlink control information (DCI) format 0/4, used for uplink grant, or a PHICH transmission carrying ACK/NACK in subframe n intended for the UE, the UE sends the corresponding PUSCH transmission in subframe n+k, where k is given in Table 4.

TABLE 4

| TDD UL/DL Configuration | \multicolumn{10}{c}{Index k for uplink data transmission in response to an uplink grant subframe number n} |

| TDD UL/DL Configuration | 0 | 1 | 2 | 3 | 4 | 5 | 6 | 7 | 8 | 9 |
|---|---|---|---|---|---|---|---|---|---|---|
| 0 |   | 4 | 6 |   |   | 4 | 6 |   |   |   |
| 1 |   |   | 6 |   | 4 |   |   | 6 |   | 4 |
| 2 |   |   | 4 |   |   |   |   |   | 4 |   |
| 3 |   | 4 |   |   |   |   |   |   | 4 | 4 |
| 4 |   |   |   |   |   |   |   |   | 4 | 4 |
| 5 |   |   |   |   |   |   |   |   | 4 |   |
| 6 |   | 7 | 7 |   |   |   | 7 | 7 |   | 5 |

For TDD uplink or downlink configuration 0, if the least significant bit (LSB) of the uplink index in the DCI format 0/4 is set to 1 in subframe n or a PHICH is received in subframe n=0 or 5 in the resource corresponding to $I_{PHICH}=1$, or a PHICH is received in subframe n=1 or 6, the UE sends the corresponding physical uplink shared channel (PUSCH) transmission in subframe n+7. If, for TDD uplink/downlink configuration 0, both the most significant bit (MSB) and LSB of the UL index in the DCI format 0 are set to 1 in subframe n, the UE sends the corresponding PUSCH transmission in both subframes n+k and n+7, where k is given in Table 4.

In summary, both the grant and HARQ timing linkage in TDD systems are more complicated than the fixed time linkages used in FDD.

Carrier Aggregation

In both LTE FDD and LTE TDD systems, carrier aggregation is defined in order to meet the LTE-Advanced throughput requirements. However, in TDD, carrier aggregation is currently only supported where the component carriers have the same uplink and downlink configurations on aggregated carriers since the intra-band carrier aggregation is prioritized and having different TDD uplink/downlink configurations (henceforth to be referred to as TDD configurations for simplicity) is difficult to support in intra-band carrier aggregation. Support is especially difficult when a single radio frequency (RF) chain is used. To achieve bandwidth flexibility and coexistence with legacy TDD systems, inter-band carrier aggregation with different TDD configurations on the carriers from different bands is currently being considered for future LTE releases.

As presently used herein, a component carrier (CC) is also referred to as a serving cell or a cell. Furthermore, when multiple component carriers are scheduled, for each UE, one of the CCs is designated as the primary carrier which is used for PUCCH transmission, semi-persistent scheduling, among other uses, while the remaining CCs are configured as secondary CCs. Such scheduling is referred to herein as cross-carrier scheduling. The primary carrier is also known as PCell (Primary cell), while any secondary component carrier is also known as SCell (Secondary cell).

Based on the disclosure above, the timing linkage in TDD systems is more complicated than in FDD systems, and the degree of complexity increases when carrier aggregation having different TDD configurations is considered. This is due to the presence of directionally conflicting subframes at some time instances among aggregated component carriers. In other words, an uplink subframe on a first component carrier may be scheduled at the same time as a downlink subframe on a second component carrier. This may lead to issues in cross-carrier scheduling when the scheduling cell (PCell) has less downlink subframes than the scheduled cell (SCell).

Figure 3:
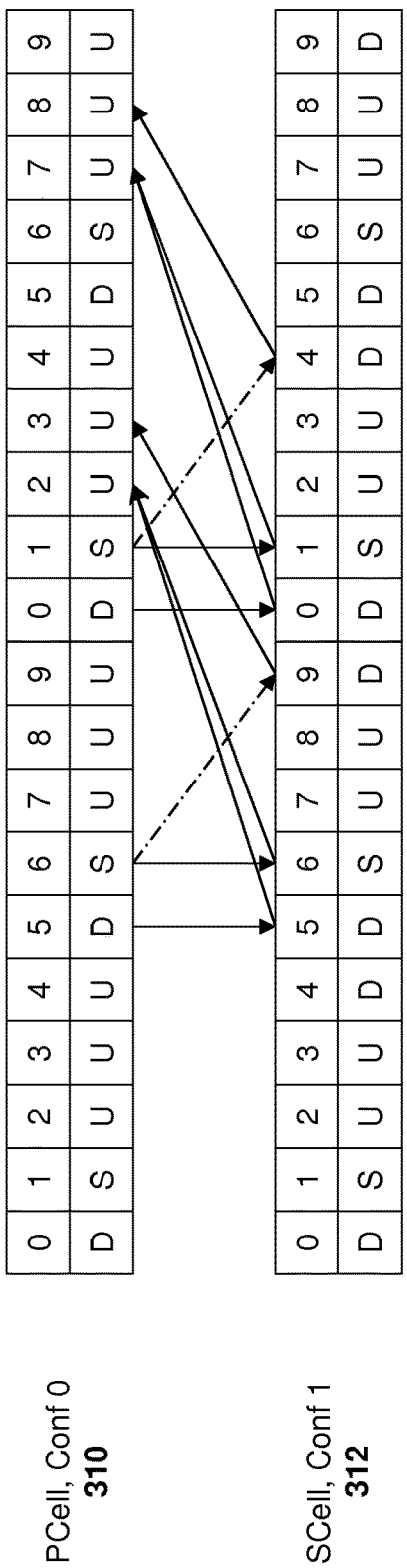
FIG. 3 is a block diagram showing downlink scheduling and HARQ feedback timing between 2 carriers with time division duplex (TDD) uplink/downlink configuration 0 for PCell and TDD uplink/downlink configuration 1 for SCell.

For example, reference is now made to FIG. 3. FIG. 3 illustrates an example of downlink cross-carrier scheduling and HARQ feedback timing, where two TDD carriers are aggregated in which a primary cell (PCell) 310 uses uplink/downlink configuration 0 and a secondary cell (SCell) 312 uses uplink/downlink configuration 1. The UE is full duplex capable. In FIG. 3, each of primary cell 310 and secondary cell 312 show the subframe number as well as the subframe type, which could be downlink ("D"), uplink ("U"), or special ("S").

In FIG. 3, the solid-line arrows from the primary cell 310 to the secondary cell 312 with the same subframe index represent the DL assignment targeted for the secondary cell for DL transmissions or retransmissions, while the arrows from secondary cell 312 to primary cell 310 represent the associated downlink HARQ ACK timing of the secondary cell.

As seen from FIG. 3, in subframes 4 and 9, a cross-subcarrier scheduling cannot be done for the secondary cell since there is no downlink subframe available in the primary cell. In particular, subframe 4 and 9 are designated as uplink subframes on primary cell 310, while they are downlink subframes in secondary cell 312. Thus, as indicated by the dot-dashed-line arrows from in the example of FIG. 3, subframes 4 and 9 of the secondary cell 312 would require a cross-subframe scheduling. Here the cross-subframe scheduling means a DL assignment targeted for the secondary cell received in subframe n is for the DL data transmission or retransmission in subframe n+k. In FIG. 3, two dot-dashed-line arrows show cross-subframe scheduling examples with k=3.

Figure 4:
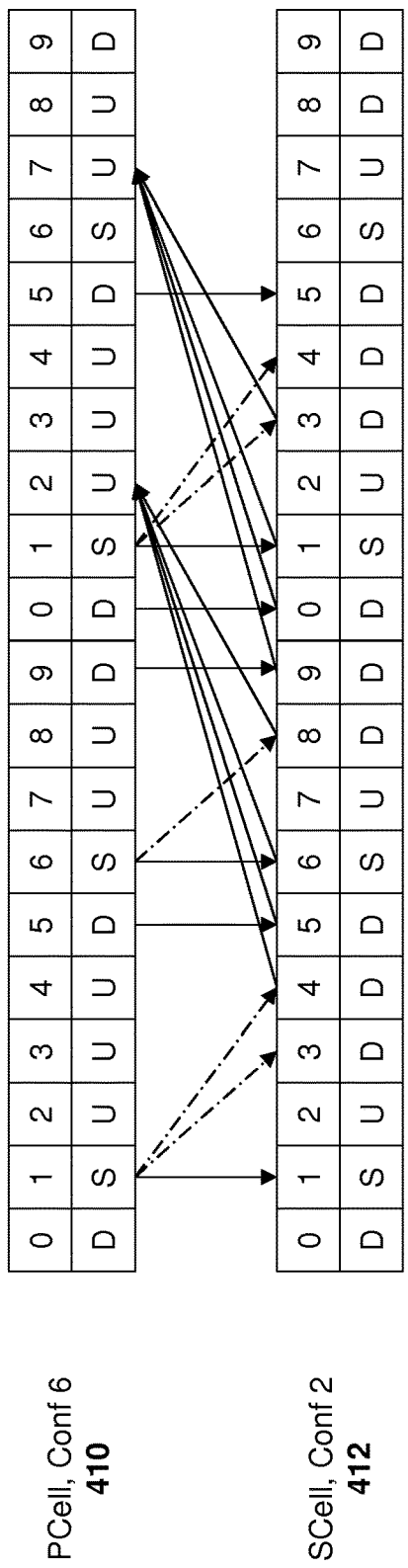
FIG. 4 is a block diagram showing downlink scheduling and HARQ feedback timing between 2 carriers with TDD uplink/downlink configuration 6 for PCell and TDD uplink/downlink configuration 2 for SCell.

In another example, reference is now made to FIG. 4 which shows two component carriers aggregated and with primary cell 410 in uplink/downlink configuration 6 and secondary cell 412 in uplink/downlink configuration 2. In this case, subframes 3, 4 and 8 on the secondary cell are downlink frames whereas on the primary cell the same subframes are uplink subframes. In accordance with the present disclosure, under the cross-carrier scheduling framework, an additional cross-subframe scheduling as provided herein may be required for these specific subframes.

In accordance with the present disclosure, two options exist for examples of subframes such as subframes 4 and 9 from FIG. 3 or subframes 3, 4 and 8 from FIG. 4. A first embodiment, in accordance with the present disclosure, provides for cross-subframe scheduling. A second embodiment provides for the disablement of cross-carrier scheduling during troubled subframes.

Cross-Subframe Scheduling

In one embodiment, the present disclosure provides for cross-subframe scheduling and introduces a cross-subframe and cross-carrier scheduling concept for the downlink so that a piece of scheduling information for one carrier received in a downlink subframe n from the scheduling carrier is treated as if it were received in downlink subframe n+k from the scheduling carrier, where k is an index to be signaled by the network. In other words, the scheduling information received from the scheduling carrier in subframe n contains the information for downlink assignments in subframe n+k.

The information or indication of the cross-subframe scheduling may be provided in various ways. In one embodiment, an index may be signaled to a UE. In another embodiment, the information may be scheduled through a carrier indicator field. In a further embodiment, the information or indication may be provided through expansion of a search space and in particular through an index for the starting control channel element (CCE) of the expanded search space. Each is described below.

Index

In accordance with one embodiment, an index is used to indicate a scheduled subframe location. The index may be signaled explicitly to a UE, for example through downlink control information. Since scheduling assignment is UE specific, the index may be added to downlink scheduling assignments for advanced carrier aggregation UEs only and thus allows for DCI formats targeted to legacy UEs to remain the same. This makes the embodiment backward compatible.

In particular, the downlink index is used to indicate the scheduled subframe location. Based on the current seven uplink/downlink TDD configurations described above with regard to Table 1, the largest possible indexing number for future downlink assignments relative to the current subframe is 3, which excludes the current subframe. The largest possible indexing number can be understood as the largest number of "D" subframes on SCell between any two consecutive "D" or "S" subframes on PCell. For example, as described in FIG. 3, for TDD uplink/downlink configuration 0 on PCell and TDD uplink/downlink configuration 1 on SCell, subframe 9 and 4 may need cross-subframe scheduling. As shown in two dot-dashed-line arrows, the scheduling received in subframe 6 from PCell may be for downlink assignments on SCell in subframe 9; while the scheduling received in subframe 1 from PCell may be for downlink assignments on SCell in subframe 4. In this case, the largest possible indexing number is 1 as between two consecutive "D" or "S" subframes on PCell (between subframe 6 and 0 or between subframe 1 and 5) there is one "D" subframe on SCell. As another example in FIG. 4, for TDD configuration 6 on PCell and TDD configuration 2 on SCell, the largest possible indexing number is 2 as between two consecutive "D" or "S" subframes on PCell there are at most two "D" subframe on SCell.

Reference is now made to Table 5, which shows the largest possible indexing number for future subframe assignments relative to the current subframe required. In Table 5, the first column provides for the scheduling cell configuration (primary cell configuration) whereas the first row provides for the scheduled cell configuration (secondary cell configuration).

Thus, for example, in the scenario where the scheduling cell has a configuration 0 whereas the scheduled cell has a configuration of 3, 4 or 5, a non-zero value indicates a support of cross-subframe assignments for future subframes are required besides the current subframe assignment. The current subframe assignment is the assignment for the current subframe. Conversely, a zero in Table 5 represents that no cross-subframe assignments are needed in that combination of configurations. For example, when both the scheduling and scheduled cells have the same configuration, then no cross-subframe is needed. Further, in some scenarios no cross-subframe scheduling is needed. For example, when the scheduling cell has a configuration number 5, no cross-subframe assignment is needed for any of the scheduled cell configurations.

TABLE 5

Largest possible number of subframes in cross-subframe scheduling

| Scheduling Cell UL/DL Configuration | Scheduled Cell UL/DL Configuration | | | | | | |
| --- | --- | --- | --- | --- | --- | --- | --- |
| | 0 | 1 | 2 | 3 | 4 | 5 | 6 |
| 0 | 0 | 1 | 2 | 3 | 3 | 3 | 1 |
| 1 | 0 | 0 | 1 | 2 | 2 | 2 | 0 |
| 2 | 0 | 0 | 0 | 1 | 1 | 1 | 0 |
| 3 | 0 | 1 | 2 | 0 | 1 | 2 | 0 |
| 4 | 0 | 0 | 1 | 0 | 0 | 1 | 0 |
| 5 | 0 | 0 | 0 | 0 | 0 | 0 | 0 |
| 6 | 0 | 1 | 2 | 2 | 2 | 2 | 0 |

Based on Table 5, the downlink index needs to include a representation of the current subframe as well and thus the resulting largest possible number of downlink cross-subframe assignments needed is four, which includes the cross-subframe assignments as well as the current subframe assignment.

In one embodiment, the introduction of a downlink index can be done with or without search space expansion.

No Search Space Expansion

If a downlink index is introduced without a search space expansion, it may be assumed that there is no change in the control channel element (CCE) search space. The CCE search spaces follow the PDCCH assignment procedure as described in the 3GPP TS 36.213 specification.

Based on the assumption of no search space expansion, for a given subframe k, the PDCCH region consists of a set of control channel elements (CCE), numbered from 0 to $N_{CCE,k}-1$, where $N_{CCE,k}$ is the total number of CCEs for subframe k. Further, for a given UE with RNTI=$n_{RNTI}$, the UE needs to monitor a search space $S_k^{(L)}$ for each of 4 possible aggregation level hypotheses, L=1, 2, 4, 8.

The starting CCE index of $S_k^{(L)}$, i.e., the first CCE used for transmission of a DCI to the UE, is denoted by $n_{CCE}$ and is given by:

$$n_{CCE}=L\cdot\{(Y_k+m+M^{(L)}\cdot n_{CI})\bmod \lfloor N_{CCE,k}/L\rfloor\} \quad (1)$$

Where m=0, 1, . . . , $M^{(L)}$–1, $M^{(L)}$ is the number of PDCCH candidates to monitor in the given search space, $n_{CI}$ is the carrier indication value of carrier indicator field (CIF), and:

$$Y_k = \begin{cases} (A \cdot Y_{k-1}) \bmod D & UE \text{ specific} \\ 0 & \text{Common} \end{cases} \qquad (2)$$

Where $Y_{-1}=n_{RNTI}\neq 0$, A=39827, D=65537 and $k=\lfloor n_s/2 \rfloor$, and where $n_s$ is the slot number within a radio frame.

From the above, the search space for an aggregation level 4 or 8 is limited to 2 candidates. This means that for the same UE, an aggregation level of 4 or 8, the eNB can schedule up to two subframes even though the downlink index can represent the worst-case four subframes, including the current subframes. This is fine for a cell with multiple UEs as some time multiplexing can be done among those UEs. Also, considering that cell-edge UEs are unlikely in a carrier aggregation mode, an aggregation level of 4 or 8 may be infrequently used for cross-subframe scheduling with carrier aggregation.

Figure 5:
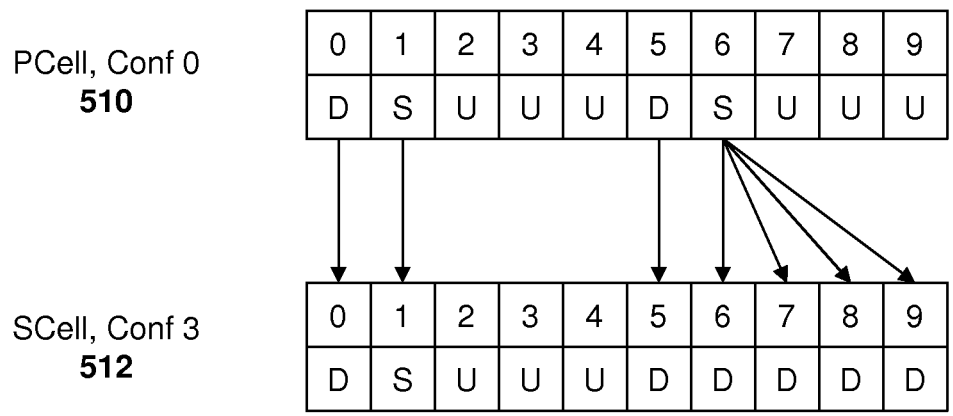
FIG. 5 is a block diagram showing downlink cross-carrier scheduling and cross-subframe scheduling between 2 carriers with TDD uplink/downlink configuration 0 for PCell and TDD uplink/downlink configuration 3 for SCell.

Reference is now made to FIG. 5, which illustrates a cross-carrier scheduling situation of a primary cell with an uplink/downlink configuration 0 aggregated with a secondary cell with an uplink/downlink configuration 3.

As seen in FIG. 5, primary cell 510 cross-carrier schedules secondary cell 512. In subframe 0 both the primary and secondary cells have downlink subframes and thus scheduling requires no cross-subframe scheduling. Similarly, subframe 1 is a special subframe for both the primary and the secondary cells and no cross-subframes scheduling is required.

Subframe 5 is also a downlink subframe for both the primary and secondary cells and no cross-subframe scheduling is required.

However, subframe 6 is a special subframe for the primary cell and subframes 7, 8 and 9 are uplink subframes on the primary cell 510, whereas on the secondary cell, subframes 6, 7, 8 and 9 are all downlink subframes. Thus, for cross-carrier scheduling, in subframe 6 on the primary cell 510, cross-subframe scheduling may be required for the eNB to schedule subframes 6, 7, 8 and 9 for the secondary cell.

The cross-subframe scheduling may be accomplished by adding 2 bits to a DCI message. One proposed downlink index mapping is presented with regard to Table 6.

TABLE 6

DL index mapping

| $b_1b_0$ | subframe location |
|---|---|
| 00 | current subframe |
| 01 | 1$^{st}$ subsequent "D" or "S" subframe to current |
| 10 | 2$^{nd}$ subsequent "D" or "S" subframe to current |
| 11 | 3$^{rd}$ subsequent "D" or "S" subframe to current |

This new 2-bit index specifies, relative to the current subframe, the location of a subsequent "D" or "S" subframe for DL data transmission. The component carrier (CC) is still determined by the carrier index in the carrier indicator field (CIF), which exists in the DCI message for the current carrier aggregation.

The subsequent "D" or "S" subframe means the next "D" or "S" subframe for downlink data transmission in its appearing order. Using TDD uplink/downlink configuration 1 in Table 1 as an example, when the current subframe number is 0, the 1$^{st}$ subsequent subframe for downlink data transmission is subframe 1, the 2$^{nd}$ subsequent subframe for DL data transmission is subframe 4, while the 3$^{rd}$ subsequent subframe for DL data transmission is subframe 5. Using TDD uplink/downlink configuration 2 in Table 1 as another example, when the current subframe number is 6, the 1$^{st}$ subsequent subframe for DL data transmission is subframe 8, the 2$^{nd}$ subsequent subframe for DL data transmission is subframe 9, while the 3$^{rd}$ subsequent subframe for DL data transmission is subframe 0 (in the next frame).

Because the DCI payload size for downlink assignment is variable, the 2-bit downlink index can simply be added to the DCI payload and increases the DCI size slightly. However, the ambiguous sizes for information bits as currently defined in the 3GPP Technical Specification 36.212, such as {12, 14, 16, 20, 24, 26, 32, 40, 44, 56} may need to be avoided.

Alternatively, a 1-bit downlink index may be used. In order to use the 1 bit downlink index, a network may limit the number of downlink subframes it may assign in cross-carrier or cross subframe scheduling. For example, the network could limit the possible TDD uplink/downlink configuration combinations of different carrier aggregations, and allow the uplink/downlink configuration combination where one cross-subframe assignment is needed. For example, in a two-carrier aggregation, TDD uplink/downlink configuration combinations in Table 5 that are marked with either '0' or '1' may be permitted whereas combinations that are marked with a '2' or '3' may not be permitted. In this case, the network can set the downlink index to '0' to indicate that the assignment is for the current subframe and set the downlink index to '1' to indicate that the assignment is for a future subframe.

In another embodiment, the network may also limit the possible subframe location that can be assigned in cross-subframe scenarios. For example, in a two-carrier aggregation, the network may allow all TDD configuration combinations in Table 5, but allow only two possible subframe assignment locations. The current subframe or one of the designated subsequent subframes among all possible choices, which may be indicated through higher layer signaling. This embodiment also allows the use of a 1-bit downlink index in the DCI.

The DCI index, either 1 bit or 2 bits from the embodiments above, may be added to UE-specific downlink scheduling assignments for advanced carrier aggregation capable UEs. DCI formats targeted to legacy UEs may remain the same and therefore the solution provided is fully backward compatible.

Search Space Expansion

In a further embodiment, the search space may be expanded to support cross-subframe scheduling.

With the expansion of the search space, the starting CCE index of $S_k^{(L)}$ in subframe k and with aggregation level L is given by:

$$n_{CCE}=L \cdot \{(Y_k+m+M^{(L)} \cdot n_{CI}+M^{(L)} \cdot N_{cc} \cdot j) \bmod \lfloor N_{CCE,k}/L \rfloor\} \qquad (3)$$

Where $Y_k$, m, $M^{(L)}$, and $n_{CI}$ are the same as those defined above, $N_{CC}$ is the total number of carriers, and j=0, 1, 2, 3 is the index to indicate this search space is for the cross-carrier and cross-subframe which is j-th subsequent "D" or "S" subframe relative to the current subframe (j=0 means for the current subframe).

In the current carrier aggregation, the search spaces are arranged such that, for a given aggregation level L, the assignment of the current subframe for all component carriers comes first, then progresses to the cross-subframe assignment, and so on. For example, the search space for the component carrier (CC)#0 of the current subframe assignment is followed by the search spaces for CC#1, CC#2 of current subframe assignment, and so on (The arrangement may be wrapped around due to the modulo operation in Equation (3)). The search spaces for CC#0, CC#1 and CC#2 of the cross-subframe scheduling are then assigned.

Based on the above, an index may be added to a DCI to indicate the assignment for cross-subframe assignments. The index may be 1 or several bits and may be used with or without search space expansion.

Figure 6:
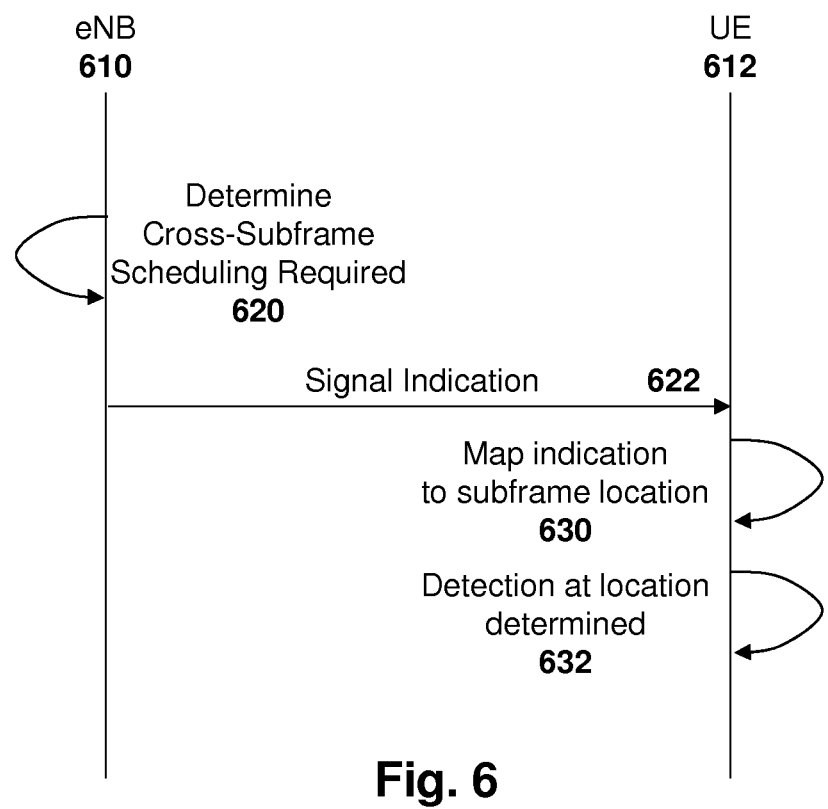
FIG. 6 is a flow diagram showing the signaling and use of an indication for cross-subframe scheduling.

Reference is now made to FIG. 6. FIG. 6 illustrates a flow diagram summarizing the above. In particular, an eNB 610 communicates with a UE 612.

At eNB 610 a determination is made regarding cross-subframe scheduling, as shown by arrow 620. The determination may be based on the configurations of the scheduling cell and the scheduled cell as well as other factors, such as traffic situation and radio channel condition, etc.

Once the determination at arrow 620 is made, the eNB 610 signals the indication to UE 612, as shown by arrow 622. UE 612 receives the indication and maps the indication to a subframe location, as shown by arrow 630. For example, if the indication is an index within a DCI message, the mapping may add the index value to the current subframe location to determine the location of the cross-subframe being scheduled in the cross-subframe scheduling.

The UE 610 then will detect the data to be received on the scheduled carrier at the determined subframe location, as shown by arrow 632.

Cross-Subframe Scheduling Using a Carrier Indicator Field Bits

In a further embodiment, existing carrier indicator field (CIF) bits may be used to handle both cross-carrier and cross-subframe scheduling indications. Various embodiments exist and can include a hard partitioning of CIF bits between carrier indications and cross-subframe scheduling, or alternatively use a joint indication scheme. Each is discussed below.

Hard Partitioning

For LTE carrier aggregation, a current 3-bit carrier indicator field (CIF) exists and is inserted at the beginning of the DCI message in accordance with the 3GPP TS 36.213 specifications. For each UE, the presence or absence of a CIF is configured semi-statically by radio resource control (RRC) signaling. In the case of inter-band carrier aggregation with different uplink/downlink configurations, the number of aggregated carriers may be small. In this case, a few bits may be enough for carrier indication purposes.

In accordance with one embodiment, several bits of the 3-bit CIF may be used for cross-subframe scheduling purposes. For example, if only two component carriers are aggregated, one bit is enough to indicate the component carriers and the remaining two bits may be used for cross-subframe scheduling. In general, if m bits, where m<3, are required for carrier indication, then (3-m) bits may be used for cross-subframe scheduling purposes. The number of bits to be used may be semi-statically configured through higher layer signaling, such as RRC signaling.

In accordance with the above, the hard partitioning will work well when there are a small number of component carriers configured. If the number of component carriers increases, then the number of cross-subframe downlink assignments supported will decrease. In other words, if the carrier indication value ($n_{CI}$) in the CIF can represent the total of N values, of which N1 is used for the component carrier indexing and the remaining N–N1 is used for cross-subframe downlink assignment indexing, then when the N1 increases, the N–N1 will decrease.

According to the uplink and downlink subframe distribution having a currently defined set of seven uplink/downlink configurations in LTE, as shown in Table 1 above, the largest possible indexing number for cross-subframe scheduling requested within one downlink subframe is 4 (including the current subframe). Thus, to schedule every downlink subframe by cross-carrier scheduling, for different uplink/downlink configuration combinations, 2 bits are needed for cross-subframe scheduling purposes. Therefore, for a 3-bit CIF, if the number of component carriers in carrier aggregation is two, 1 bit may be used for CIF to indicate on which carrier this scheduling is intended and the remaining 2 bits may be used for cross-subframe scheduling to indicate on which subsequent "D" or "S" subframe related to the current subframe this scheduling is intended. In this case, the 3-bit CIF can cover 2-carrier aggregation and the largest possible indexing number for cross-subframe scheduling, which is 4, from all uplink/downlink configuration combinations.

If the number of component carriers is three or four, 2 bits may be used for CIF and the remaining bit may be used for cross-subframe scheduling. In this case, only uplink/downlink configuration combinations with the largest possible indexing number equal to 0 and 1 in Table 5 may be supported without losing any scheduling ability to cover all downlink subframes. However, other combinations with the largest possible indexing number equal to 2 or 3 may also be used if restrictions are placed on which subframes can be scheduled with the 1 bit. As will be appreciated by those in the art, not all subframes may be scheduled if there is only one bit for the cross-subframe scheduling to cover all configuration combinations of scheduled and scheduling carriers.

The use of hard-partitioning CIF may work with either no search space change or a search space change. With no search space change, the search space as defined above with regard to no search space expansion may be used. It is also possible to use the search spaces defined above with regard to search space expansion to explicitly show the dependency of search spaces on the value used for the component carriers and the value used for downlink subframes. In that case, $n_{CI}$ is the value of indicating the number of carriers from the hard-partitioned CIF portion for carrier index while j is the subsequent "D" or "S" subframe index from the hard-partitioned CIF for the subsequent "D" or "S" subframe index at the carrier specified by $n_{CI}$.

Figure 7:
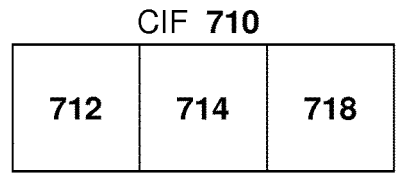
FIG. 7 is a block diagram of a carrier indicator field (CIF) and the bits therein.

Reference is now made to FIG. 7, which shows a 3 bit CIF 710. In the embodiment of FIG. 7, two main carriers are configured and therefore, for example, bit 712 may be used to designate which carrier is being scheduled. For example, a 0 may indicate that the scheduling carrier (primary cell) and a 1 may indicate the other carrier (secondary cell).

Bits 714 and 718, in the example of FIG. 7, may therefore be used for cross-subframe scheduling. The use of 2 bits for cross-subframe scheduling can cover the largest indexing number equal to 4, which is 3 as shown in Table 5 plus 1 for the current subframe, and can allow for all of the configuration combinations in a two-carrier aggregation scenario as shown above with regard to Table 5. For example, a "00" may indicate the current subframe, a "01" may indicate the first subsequent "D" or "S" subframe, a "10" may indicate a second subsequent "D" or "S" subframe, and a "11" may indicate a third subsequent "D" or "S" subframe, for example. Here, the subsequent "D" or "S" subframe is relative to the current subframe and it has the same meaning as that in Table 6, which as explained earlier is referred to as the subframes designated as downlink subframe "D" or special subframe "S" across all carriers available for downlink assignments. However, the above is merely meant as an example and is not limiting and other designations could be provided.

Joint CIF Indication

In an alternative embodiment, instead of hard partitioning CIF bits between a carrier indication and a cross-subframe scheduling indication, a joint indication scheme may be used to enhance the indication. A CIF mapping table may depend on a number of aggregated component carriers and their uplink/downlink configurations. The mapping be may be semi-statically configured by RRC signaling in one embodiment.

For example, using three-carrier aggregation with a scheduling cell, a scheduled cell 1, and a scheduled cell 2, Table 7 maps the $n_{CI}$ value in the CIF to the carrier and subframe location and may be used for cross-carrier and cross-subframe scheduling purposes.

TABLE 7

CIF mapping example using joint indication scheme

| index | CIF | Carrier | subframe location |
|---|---|---|---|
| 0 | 000 | Scheduling | Current subframe |
| 1 | 001 | Scheduled 1 | Current subframe |
| 2 | 010 | Scheduled 2 | Current subframe |
| 3 | 011 | Scheduled 1 | $1^{st}$ subsequent "D" or "S" subframe to current |
| 4 | 100 | Scheduled 2 | $1^{st}$ subsequent "D" or "S" subframe to current |
| 5 | 101 | Scheduled 1 | $2^{nd}$ subsequent "D" or "S" subframe to current |
| 6 | 110 | Scheduled 2 | $2^{nd}$ subsequent "D" or "S" subframe to current |
| 7 | 111 | Scheduled 1 | $3^{rd}$ subsequent "D" or "S" subframe to current |

Figure 8:
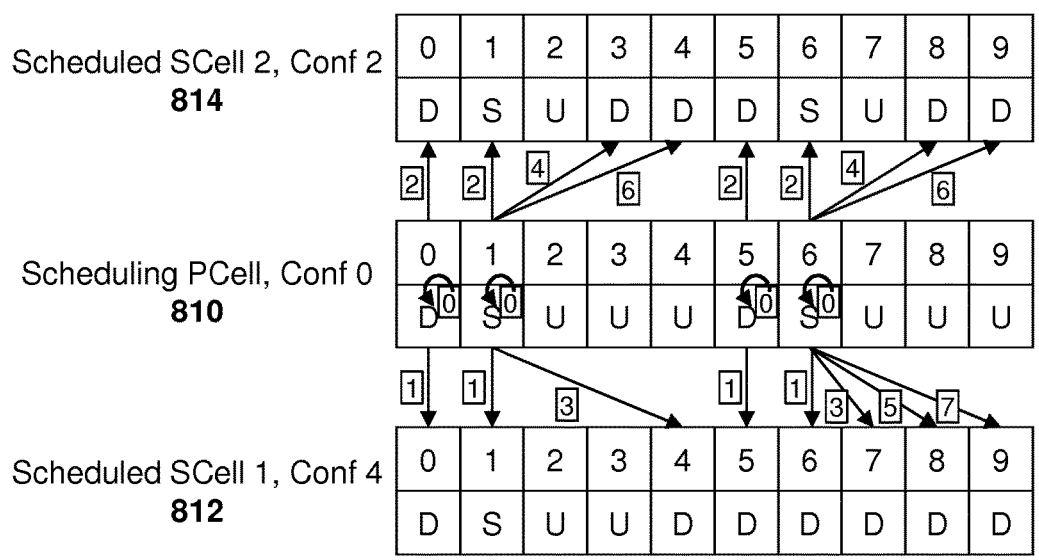
FIG. 8 is a block diagram showing the cross-carrier scheduling and cross-subframe scheduling of 3 component carriers, with TDD uplink/downlink configuration 4 and 2 for two secondary carriers, respectively, and a primary carrier with TDD uplink/downlink configuration 0, using jointly coded carrier indicator fields.

Reference is now made to FIG. 8, which shows a PCell 810 along with a first SCell 812 and a second SCell 814 as a three-carrier aggregation example. In this example, PCell is in configuration 0, SCell 1 is in configuration 4, while SCell 2 is in configuration 2.

As seen in FIG. 8, in subframe 0, the scheduling may either be for the current component carrier or either the scheduled cell 1 or scheduled cell 2. No cross-subframe scheduling is required since all three are downlink subframes.

In subframe 1, if scheduling for either subframe 1, subframe 3, or subframe 4 on the second SCell 814, the PCell 810 may need to configure cross-subframe scheduling for those subframes on the SCell 814. From Table 7 and as indicated in FIG. 8, an index of 2 would indicate the current subframe, an index of 4 would indicate the first subsequent "D" or "S" subframe relative to the current and an index of 6 would indicate the second subsequent "D" or "S" subframe relative to the current.

Similarly, when scheduling for first SCell 812, an index of 1 would indicate the current subframe while an index of 3 would indicate the first subsequent "D" or "S" subframe relative to the current. Indices 5, 7 are used to indicate the second and third subsequent "D" or "S" subframes of the SCell 812 to schedule.

The mapping in Table 7 is an example. Other more generic CIF based joint indication mapping is also possible. For example, all supported component carriers (CC) between the eNB and a UE can be arranged in this order for M component carriers: CC#0, CC#1, . . . , CC#M−1. The corresponding subframes can be put into a subframe order with a same subframe index across all M component carriers followed by an increased subframe index across all M component carriers. By assuming the current subframe index is #n at the scheduling carrier (CC#0), the subframe order across all M component carriers may be arranged as: #n (CC#0), #n (CC#1), . . . , #n (CC#M−1), #n+1 (CC#0), #n+1 (CC#1), . . . , #n+1 (CC#M−1), #n+2 (CC#0), #n+2 (CC#1), . . . , #n+2 (CC#M−1), . . . and so forth.

With the above subframe order and the knowledge of the TDD uplink/downlink configuration in each component carrier, which is known to the eNB and the UE, the CIF index can be mapped as: index 0 mapped to the current subframe#n on the scheduling carrier (CC#0), index 1 mapped to the first subsequent "D" or "S" subframe after #n (CC#0) in the above subframe order, index 2 mapped to the second subsequent "D" or "S" subframe after #n (CC#0) in the above subframe order, and so forth. The coordination on the order of M component carriers between the eNB and a UE can be explicitly signaled through RRC signaling. The subframe order is implicitly established according to the order of M component carriers.

In the case that 3 CIF bits are not enough to handle all cross-carrier and cross-subframe scheduling, the system may decide to give up certain capabilities, such as disabling certain cross-subframe abilities, or to use additional methods in accordance with the disabling of cross-carrier scheduling as described below. The configuration of how to handle such situations can be accomplished through RRC signaling in one embodiment.

The solution of using the CIF value $n_{u}$ to jointly represent cross-carrier and cross-subframe scheduling may work with no search space change. In this case, the search spaces defined for CIF values as shown above may be used.

Referring again to FIG. 6, the hard partitioned CIF or joint coded CIF may be the signaled indication at arrow 622, and the mapping at arrow 630 might involve either using the bits for cross-subframe scheduling to provide an offset from the current subframe, or using a lookup table for jointly coded CIF to determine the location of the subframe to be detected.

Cross-Subframe Scheduling Using Different Search Spaces

In accordance with a further embodiment, a new set of search spaces for downlink cross-subframe assignments may be created. The newly created set of search spaces are offset from the current sets of downlink assignment search spaces and the starting control channel element (CCE) index of any new search space is different from the starting CCE index of any existing search space. In this way, a UE may be able to interpret the subframe position related to the assignment based on the starting CCE index of a search space from which a DCI to the UE was detected.

Thus, the new set of search spaces for cross-subframe assignments may be created, and based on the start of the CCE index of the search space where the DCI is detected, the UE may be able to interpret the subframe position related to the assignment. The new set of search spaces might partially overlap existing sets of search spaces but the starting CCE index of any new search space does not collide with the starting CCE index of any existing search space.

Figure 9:
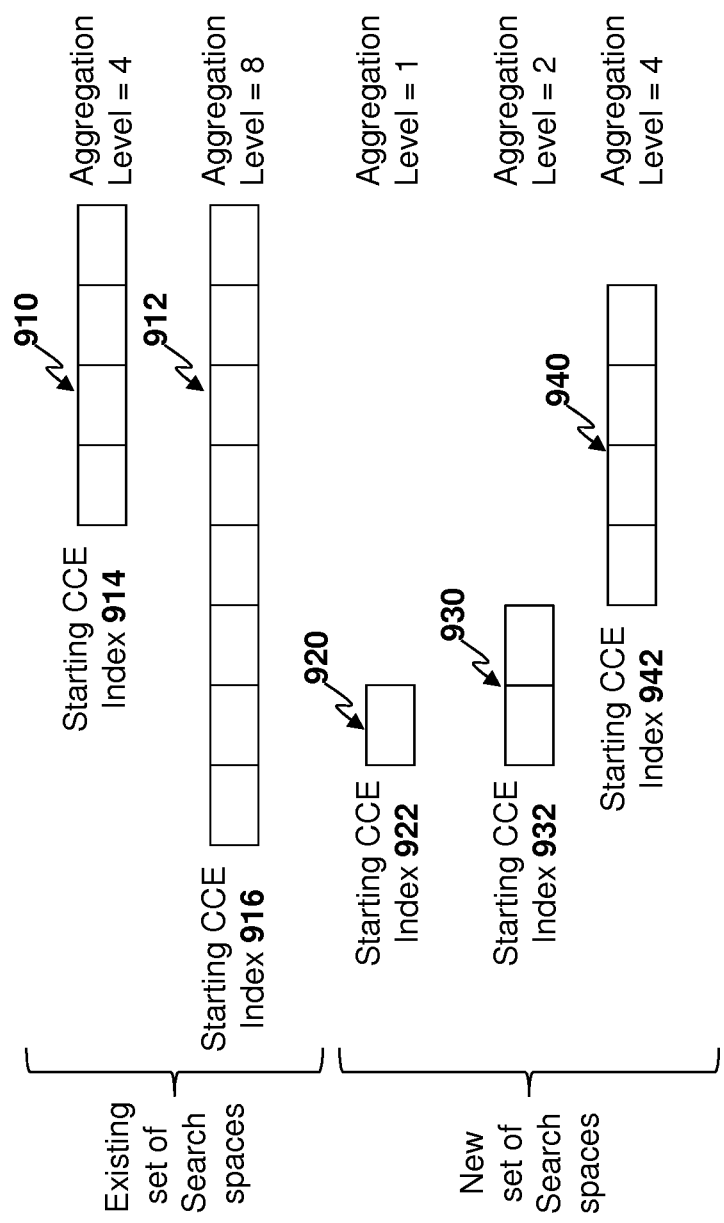
FIG. 9 is an example diagram showing starting CCE indices of a new set of search spaces for providing an indication of cross-subframe scheduling different from starting CCE indices of the existing set of search spaces.

An illustration on the search spaces with different starting CCE indices is shown with regard to FIG. 9. In the embodiment of FIG. 9 the new set of search spaces might overlap with existing sets of search spaces but the starting index of any new search space is different from the starting index of any existing search space. In this way, a DCI detection from an existing search space hypothesis will be very difficult to be detected under any new search space hypothesis as the starting index is different, the corresponding interleaved soft bits are different, and the resulting decoding bits will be highly likely wrong.

In FIG. 9, existing search spaces are shown as search space 910 for an aggregation level of 4 and 912 for an aggregation level of 8. A starting CCE index 914 for search 910 is shown in a first position. A starting CCE index 916 for a search space 912 is shown in a second position.

In accordance with one embodiment of the present disclosure, a new search space 920 is provided with an aggregation level of 1 where the starting CCE index 922 differs from starting CCE indexes 914 or 916.

Similarly, a search space 930 may be provided for an aggregation level of 2 where the starting CCE index 932 is different from the starting CCE indexes 914 and 916.

For an aggregation level of 4, a new search space 940 is provided in the example of FIG. 9 with a starting CCE index 942 that differs from the starting CCE indexes 914 and 916 from search spaces 910 and 912 respectively.

As indicated in the new index embodiment above, the starting CCE index of $S_k^{(L)}$ is given by:

$$n_{CCE}=L\cdot\{(Y_k+m+M^{(L)}\cdot n_{CI})\bmod \lfloor N_{CCE,k}/L\rfloor\} \quad (4)$$

Where $Y_k$, m, $M^{(L)}$, and $n_{CI}$ are the same as those defined above.

For the purposes of cross-subframe scheduling, the new search spaces $S_{k,cs(j)}^{(L)}$ j=1, . . . , J for advanced CA UEs to search for cross-subframe downlink assignments may be defined. J is the largest possible indexing number for cross-subframe downlink assignments needed in a given downlink subframe. $S_{k,cs(j)}^{(L)}$ is the search space in subframe k with an aggregation level L for the j-th cross-subframe scheduled subframe. The new search spaces are only defined in the downlink subframe where cross-subframe scheduling is needed.

The starting CCE index of the newly defined search spaces may be offset from the current CCE indexes. This may be written as:

$$n_{CCE,cs(j)}=n_{CCE}+\text{offset}(j), j=1,\ldots J \quad (5)$$

The resulting $n_{CCE,cs(j)}$ needs to be modulo'ed by $N_{CCE,k}$ (or $2\cdot\lfloor N_{CCE,k}/2\rfloor$ if $N_{CCE,k}$ is not an even number) to make sure that $n_{CCE,es(j)}$ is within the range of 0 to $N_{CCE,k}-1$.

Using the above offset, advanced CA UEs may be able to interpret which subframe a decoded downlink assignment is related to based on the starting position of the CCE index of the search space carrying the downlink assignment that was decoded.

If the total number of CCEs is large, the new sets of search spaces for future subframes in other carriers could be separated from existing sets of search spaces for current subframes and for multiple carriers. However, when the number of CCEs is small, it may be difficult to separate the new set of search spaces from the existing set of search spaces. In one embodiment, a design rule may be implemented to separate the starting CCE index of the search spaces for future subframe scheduling from the starting CCE index of the existing search spaces. The design rule, for example, may be:

The starting CCE index of any new search space is different from the starting CCE index of any existing search space. If there is a collision, that starting CCE index cannot be used as a new search space.

The starting CCE index of new search spaces with aggregation level=2, 4, 8 is restricted to an odd number. This will be different from any starting CCE index of existing search spaces with aggregation level=2, 4, 8 as the latter by design is an even number.

The starting CCE index of new search spaces with aggregation level=1 is pushed far away from the starting CCE index of search spaces with aggregation level=1. This is possible as long as the total number of CCEs is larger than 7.

As an example, the starting CCE index given by:

$$n_{CCE,cs(1)}=(1+n_{CCE}+2\cdot\lfloor N_{CCE,k}/4\rfloor)\bmod(2\cdot\lfloor N_{CCE,k}/2\rfloor) \quad (6)$$

for J=1 and $$n_{CCE,cs(1)}\notin\{n_{CCE}, \text{ for } L=1,2,4,8 \text{ and } m=0,1,\ldots,M^{(L)}-1\} \quad (7)$$

Where $n_{CCE,cs(1)}$ is the starting CCE index for the first subsequent cross-subframe scheduled subframe. Note that, in the above equations, the term: $2\cdot\lfloor N_{CCE,k}/4\rfloor$ is used to push $n_{CCE,cs(1)}$ to be approximately $N_{CCE,k}/2$ CCEs away from $n_{CCE}$. The term $2\cdot\lfloor N_{CCE,k}/2\rfloor$ is to make sure the divisor in the modulo operation is an even number. To avoid confusion, $n_{CCE,cs(1)}$ should not be in the set of all possible starting indices $\{n_{CCE}$, for L=1, 2, 4, 8 and m=0, 1, . . . , $M^{(L)}-1\}$ as any index in that set is treated for the existing (legacy) search spaces.

Reference is now made to Table 8, which shows an example of a 10 MHz system with a 2-OFDM symbol PDCCH region.

TABLE 1

Received candidates in subframe#0 of a 10 MHz system with 2 OFDM symbols PDCCH for J = 1

| Type | Aggregation level (L) | Candidate (m) | $N_{CCE,k}$ (for k = 0) | $n_{CCE}$ | $n_{CCE,cs}$ (for J = 1) | Notes |
|---|---|---|---|---|---|---|
| UE specific search space ($n_{RNTI}$ = 55 in this example) | 1 | 0 | 26 | 22 | 9 | |
| | 1 | 1 | 26 | 23 | 10 | |
| | 1 | 2 | 26 | 24 | 11 | |
| | 1 | 3 | 26 | 25 | 12 | This cannot be used as 12 appears in the column of $n_{CCE}$. |
| | 1 | 4 | 26 | 0 | 13 | |

TABLE 1-continued

Received candidates in subframe#0 of a 10 MHz system with 2 OFDM symbols PDCCH for J = 1

| Type | Aggregation level (L) | Candidate (m) | $N_{CCE,k}$ (for k = 0) | $n_{CCE}$ | $n_{CCE,cs}$ (for J = 1) | Notes |
|---|---|---|---|---|---|---|
|  | 1 | 5 | 26 | 1 | 14 |  |
|  | 2 | 0 | 26 | 18 | 5 |  |
|  | 2 | 1 | 26 | 20 | 7 |  |
|  | 2 | 2 | 26 | 22 | 9 |  |
|  | 2 | 3 | 26 | 24 | 11 |  |
|  | 2 | 4 | 26 | 0 | 13 |  |
|  | 2 | 5 | 26 | 2 | 15 |  |
|  | 4 | 0 | 26 | 8 | 21 |  |
|  | 4 | 1 | 26 | 12 | 25 |  |
|  | 8 | 0 | 26 | 16 | 3 |  |
|  | 8 | 1 | 26 | 0 | 13 |  |
| Common search space | 4 | 0 | 26 | 0 | 13 |  |
|  | 4 | 1 | 26 | 4 | 17 |  |
|  | 4 | 2 | 26 | 8 | 21 |  |
|  | 4 | 3 | 26 | 12 | 25 |  |
|  | 8 | 0 | 26 | 0 | 13 |  |
|  | 8 | 1 | 26 | 8 | 21 |  |

For Table 8, J=1, meaning a limitation for the table is that the eNB can use the search space to separate one future subframe scheduled from the current subframe scheduling. For a larger J, the total number of CCEs may need to be large in order to separate different sets of search spaces. Otherwise, the eNB may need to include the limitation of scheduling of up to one future subframe.

When the number of the SCell downlink subframes between two PCell downlink subframes is greater than or equal to 2, the eNB might need to use extra RRC messages in a semi-static mode to notify each UE which future subframe the new search space applies so that multiple UEs can share those SCell downlink subframes.

Referring again to FIG. 6, in accordance with the expanded search space embodiment, the starting CCE index may be the indication in the message of arrow 622, and the mapping might use a lookup to determine the appropriate cross-subframe location.

In a further embodiment, if a UE detects in subframe#n a downlink cross-subframe scheduling from a PCell (at carrier#0) targeted for a SCell (at carrier#m) but for the downlink assignment in subframe #n+k, the UE may search for possible downlink reassignments from the SCell (at carrier#m) in subframe#n+k. Note that the cross-subframe scheduling was on the PCell while the potential re-assignment scheduling will be on the SCell. In this way, the eNB can further reschedule the subframe #n+k in the SCell to override the scheduling done earlier in subframe #n at PCell. This may be useful in scenarios where the channel and traffic conditions are changing rapidly. In this case, a UE may be triggered by the PCell scheduling to the UE in subframe #n to read a potentially updated scheduling for the UE in subframe #n+k. If a UE does not find anything from PCell subframe #n, the UE will not read the SCell in subframe #n+k. This type of triggering has a battery consumption advantage over the approach requiring all UEs in the cell to monitor the SCell subframe #n+k, which may adversely affect the battery consumption of all UEs. Further, the scheduling override feature described in this paragraph may be applicable to all cross-subframe scheduling solutions provided in the present disclosure.

Disable Cross-Carrier Scheduling

In a further embodiment, instead of using an indication for cross-subframe scheduling to address the issues due to mixed uplink/downlink TDD configurations with cross-subcarrier scheduling, cross-carrier scheduling can be disabled for problematic subframes. Thus, whenever there is no downlink subframe on the scheduling cell to cross-schedule the downlink transmission for another cell (the scheduled cell), UEs may search the PDCCH on the scheduled cell for possible downlink assignments. Basically, the cross-carrier scheduling function is disabled at that subframe.

Two embodiments are provided to implement the above in a UE. In a first embodiment, since the UE has already been informed of the uplink/downlink configuration for each aggregated component carrier, the UE knows the difference in configuration between the scheduling (primary) cell and the at least one scheduled (secondary) cell. The UE can thus search for scheduling assignments in a subframe from the at least one scheduled cell whenever the subframe is a "D" or "S" subframe at the at least one scheduled cell but is a "U" subframe at the scheduling cell.

In a second embodiment, a higher layer message, such as an RRC signaling message, can be used to semi-statically configure advanced carrier aggregation UEs at which subframes the UEs needs to search downlink assignments from the PDCCH on the at least one scheduled cell. This configuration may not have to completely match with the pattern of unavailable scheduling downlink subframes and may be completely flexible per UE.

The second embodiment may be useful in cases such as the CIF solution embodiment discussed above, where the CIF solution does not have enough bits to indicate all possible cross-carrier and cross-subframes.

Figure 10:
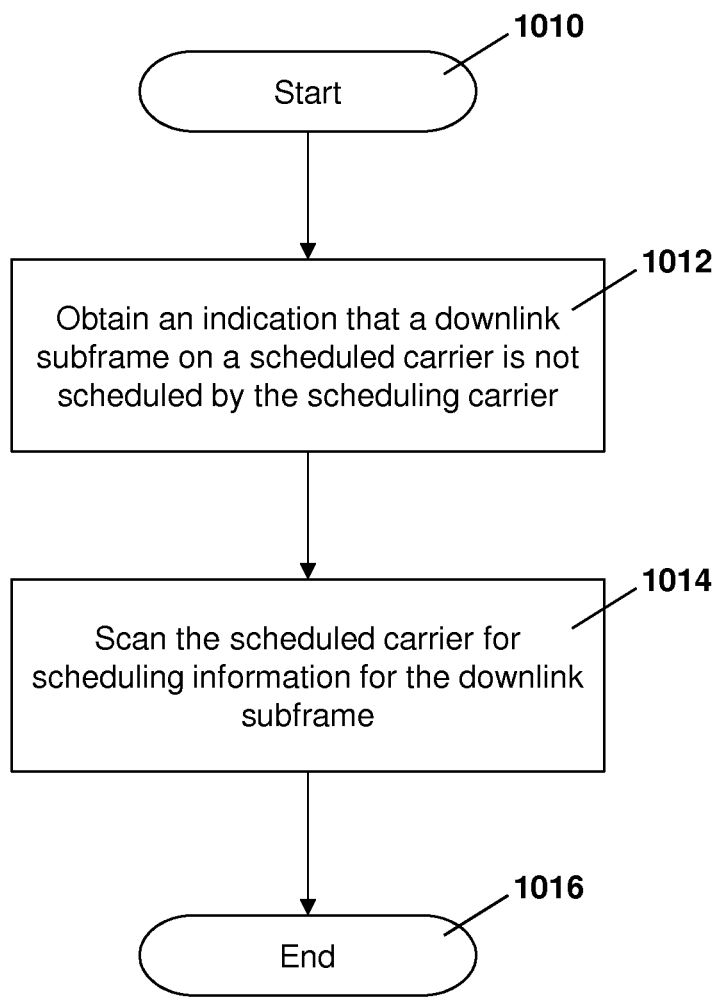
FIG. 10 is a flow diagram showing a method for blocking cross-carrier scheduling in certain downlink subframes.

Reference is now made to FIG. 10, which shows a flow diagram for ignoring troubled cross-carrier scheduling. In particular the process of FIG. 10 starts at block 1010 and proceeds to block 1012 in which a UE obtains an indication that a downlink subframe (or subframes) on a scheduled carrier (or carriers) will not be scheduled by the scheduling carrier. The indication could be a determination at the UE based on the known uplink/downlink configurations of the scheduling and scheduled carriers, or could be based on higher layer signaling as described above.

From block 1012, the process proceeds to block 1014 in which the UE scans the PDCCH of the scheduled carrier (or carriers) during the downlink subframe (or subframes) that is not scheduled by the scheduling subframe.

The process then proceeds to block 1016 and ends.

While the above solutions are proposed for UE-specific DCI, the CIF based scheme and the disabling of cross-carrier scheduling schemes can also be applied to broadcasting messages. No search space expansion is needed.

Moreover, although the solutions are described for LTE TDD systems with mixed uplink/downlink configurations, they are equally applicable to LTE TDD systems with the same configuration and equally applicable to LTE FDD systems to schedule future subframes if needed. This can provide additional freedom for the eNB downlink scheduling in case search spaces in certain subframes are not enough within the maximum number of downlink control symbols configured while there are search spaces in certain subframes.

If in subframe #n, a UE detects a cross-subframe assignment scheduled to the UE but for subframe #n+k, the UE does not need to monitor or decode UE specific PDCCHs in subframe #n+k and this can provide some savings of the battery power for the UE. For cross-subframe scheduling overriding features indicated above, the eNB and the UE can communicate semi-statistically to turn the overriding features off to allow a UE to skip the monitoring of the UE specific PDCCH in subframe #n+k if, in subframe #n, the UE detected a cross-subframe scheduling for subframe #n+k.

Figure 11:
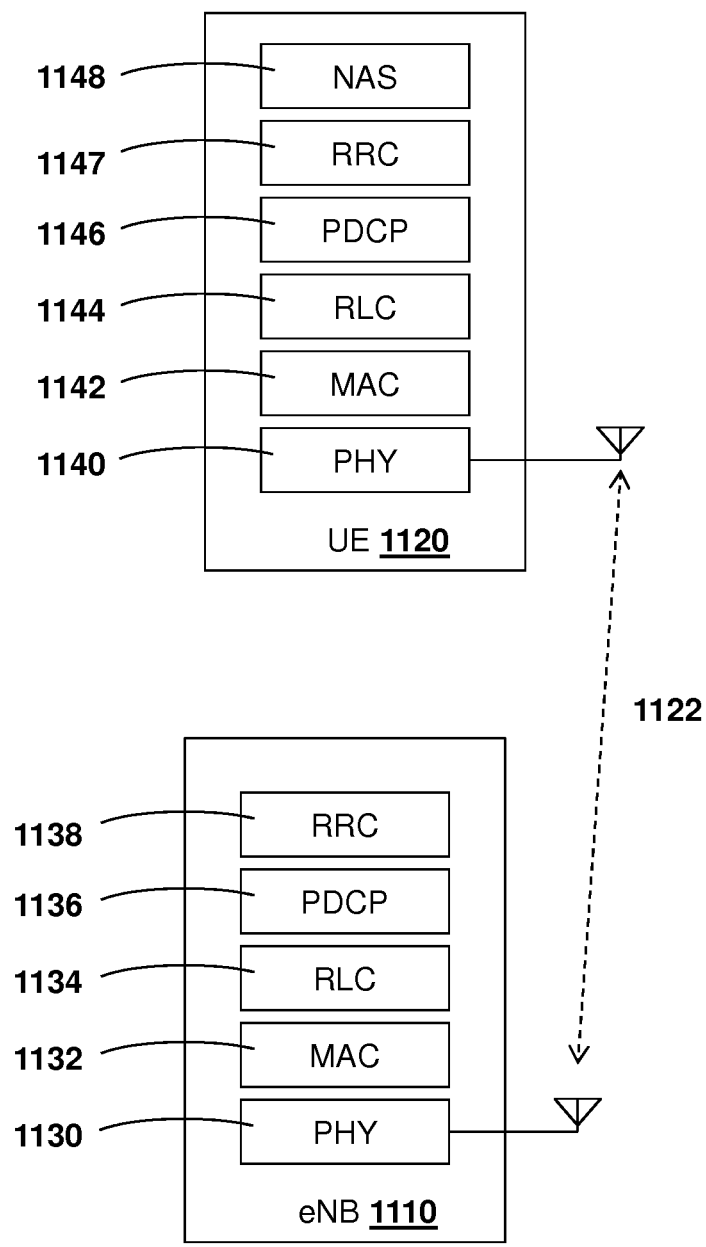
FIG. 11 is a protocol diagram showing communication between an eNB and a UE.

Reference is now made to FIG. 11, which shows a simplified architecture for communication between various elements in a system for the control plane. A similar protocol stack exists for the user plane. In the following the control plane protocol stack is used as an example. In particular, eNB 1110 provides cell coverage to a first area and may serve a UE 1120, which communicates with eNB 1110 through wireless communication link 1122.

As shown in the example of FIG. 11, each element includes a protocol stack for the communications with other elements. In the case of eNB 1110, the eNB includes a physical layer 1130, a medium access control (MAC) layer 1132, a radio link control (RLC) layer 1134, a packet data convergence protocol (PDCP) layer 1136 and a radio resource control (RRC) layer 1138.

In the case of UE 1120, the UE includes a physical layer 1140, a MAC layer 1142, an RLC layer 1144, a PDCP layer 1146, an RRC layer 1147 and a non-access stratum (NAS) layer 1148.

Communications between the entities, such as between eNB 1110 and UE 1120, generally occur within the same protocol layer between the two entities. Thus, for example, communications from the RRC layer at eNB 1110 travel through the PDCP layer, RLC layer, MAC layer and physical layer and get sent over the physical layer to UE 1120. When received at UE 1120, the communications travel through the physical layer, MAC layer, RLC layer, PDCP layer to the RRC level of UE 1120. Such communications are generally done utilizing a communications sub-system and a processor, as described in more detail below.

The above may be implemented by any network element. A simplified network element is shown with regard to FIG. 12.

Figure 12:
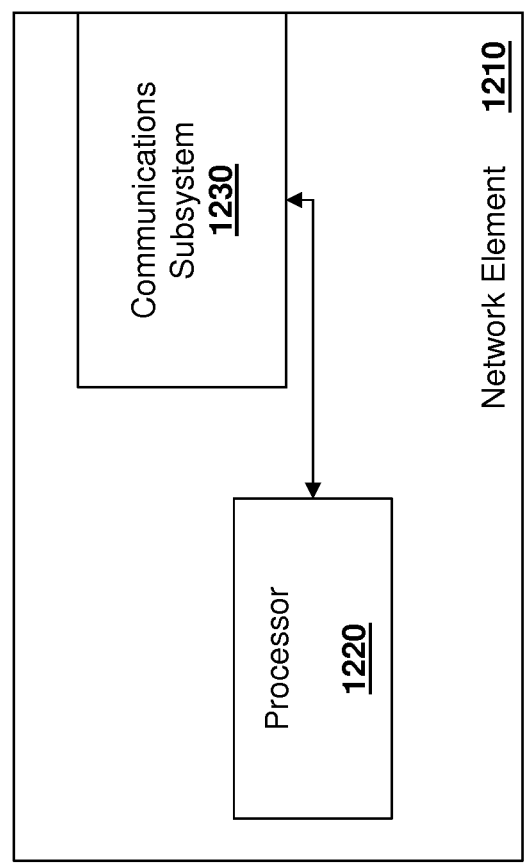
FIG. 12 is a simplified block diagram of a network element.

In FIG. 12, network element 1210 includes a processor 1220 and a communications subsystem 1230, where the processor 1220 and communications subsystem 1230 cooperate to perform the methods described above.

The above may be also implemented by any UE. One exemplary device is described below with regard to FIG. 13.

UE 1300 is typically a two-way wireless communication device having voice and data communication capabilities. UE 1300 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1300 is enabled for two-way communication, it may incorporate a communication subsystem 1311, including both a receiver 1312 and a transmitter 1314, as well as associated components such as one or more antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate.

Network access requirements will also vary depending upon the type of network 1319. In some networks network access is associated with a subscriber or user of UE 1300. A UE may require a removable user identity module (RUIM) or a subscriber identity module (SIM) card in order to operate on a CDMA network. The SIM/RUIM interface 1344 is normally similar to a card-slot into which a SIM/RUIM card can be inserted and ejected. The SIM/RUIM card can have memory and hold many key configurations 1351, and other information 1353 such as identification, and subscriber related information.

Figure 13:
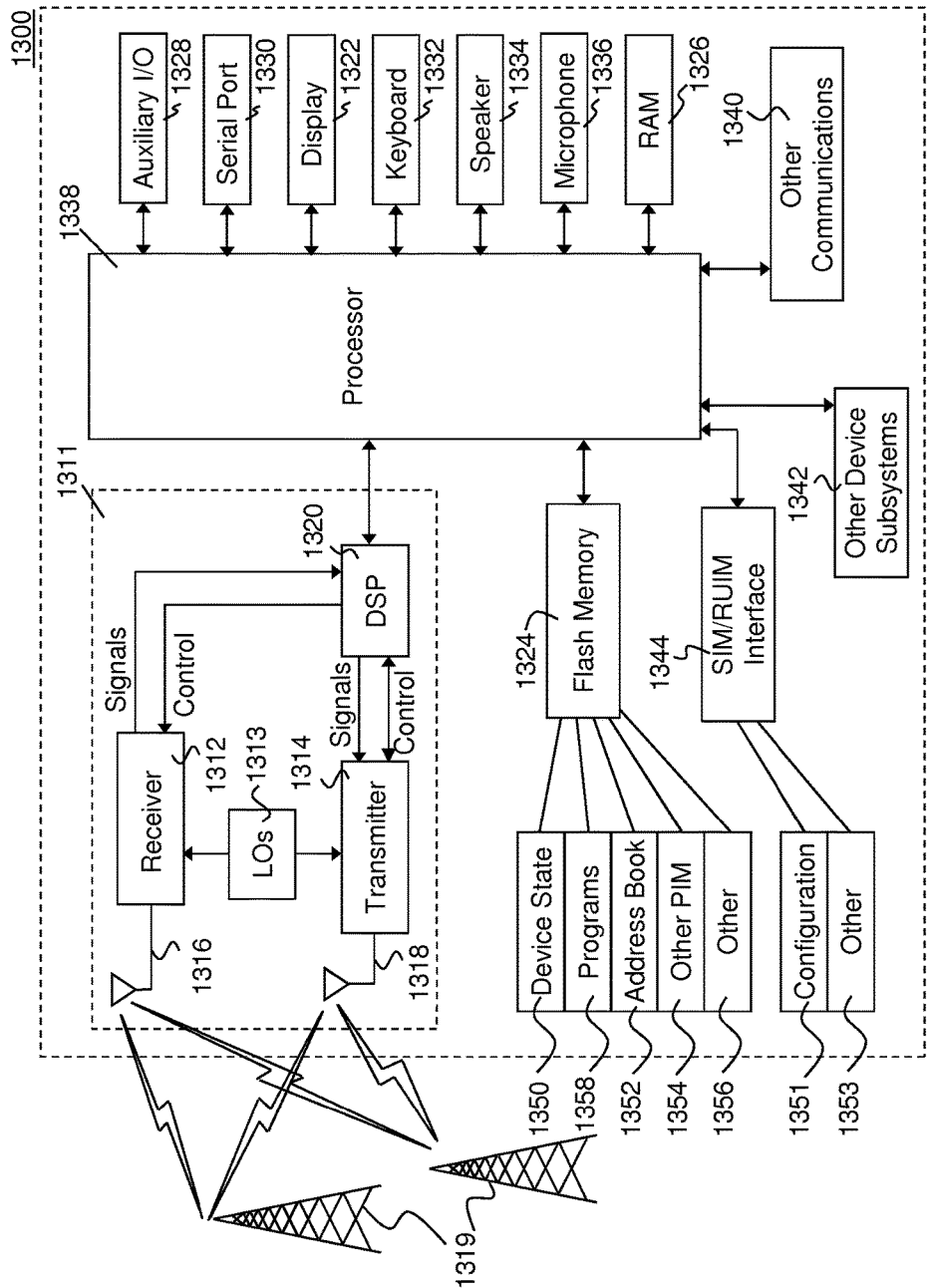
FIG. 13 is a block diagram of an example user equipment.

When required network registration or activation procedures have been completed, UE 1300 may send and receive communication signals over the network 1319. As illustrated in FIG. 13, network 1319 can consist of multiple base stations communicating with the UE.

Signals received by antenna 1316 from communication network 1319 are input to receiver 1312, which may perform such common receiver functions as signal amplification, frequency down conversion, filtering, channel selection and the like. ND conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1319 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

UE 1300 generally includes a processor 1338 which controls the overall operation of the device. Communication functions, including data and voice communications, are performed through communication subsystem 1311. Processor 1338 also interacts with further device subsystems such as the display 1322, flash memory 1324, random access memory (RAM) 1326, auxiliary input/output (I/O) subsystems 1328, serial port 1330, one or more keyboards or keypads 1332, speaker 1334, microphone 1336, other communication subsystem 1340 such as a short-range communications subsystem and any other device subsystems generally designated as 1342. Serial port 1330 could include a USB port or other port known to those in the art.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the processor 1338 may be stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Processor 1338, in addition to its operating system functions, may enable execution of software applications on the UE. A predetermined set of applications that control basic operations, including at least data and voice communication applications for example, will normally be installed on UE 1300 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1319. Further applications may also be loaded onto the UE 1300 through the network 1319, an auxiliary I/O subsystem 1328, serial port 1330, short-range communications subsystem 1340 or any other suitable subsystem 1342, and installed by a user in the RAM 1326 or a non-volatile store (not shown) for execution by the processor 1338. Such flexibility in application installation increases the functionality of the device and may provide enhanced on-device functions, communication-related functions, or both. For example, secure communication applications may enable electronic commerce functions and other such financial transactions to be performed using the UE 1300.

In a data communication mode, a received signal such as a text message or web page download will be processed by the communication subsystem 1311 and input to the processor 1338, which may further process the received signal for output to the display 1322, or alternatively to an auxiliary I/O device 1328.

A user of UE 1300 may also compose data items such as email messages for example, using the keyboard 1332, which may be a complete alphanumeric keyboard or telephone-type keypad, among others, in conjunction with the display 1322 and possibly an auxiliary I/O device 1328. Such composed items may then be transmitted over a communication network through the communication subsystem 1311.

For voice communications, overall operation of UE 1300 is similar, except that received signals would typically be output to a speaker 1334 and signals for transmission would be generated by a microphone 1336. Alternative voice or audio I/O subsystems, such as a voice message recording subsystem, may also be implemented on UE 1300. Although voice or audio signal output is generally accomplished primarily through the speaker 1334, display 1322 may also be used to provide an indication of the identity of a calling party, the duration of a voice call, or other voice call related information for example.

Serial port 1330 in FIG. 13 would normally be implemented in a personal digital assistant (PDA)-type UE for which synchronization with a user's desktop computer (not shown) may be desirable, but is an optional device component. Such a port 1330 would enable a user to set preferences through an external device or software application and would extend the capabilities of UE 1300 by providing for information or software downloads to UE 1300 other than through a wireless communication network. The alternate download path may for example be used to load an encryption key onto the device through a direct and thus reliable and trusted connection to thereby enable secure device communication. As will be appreciated by those skilled in the art, serial port 1330 can further be used to connect the UE to a computer to act as a modem.

Other communications subsystems 1340, such as a short-range communications subsystem, is a further optional component which may provide for communication between UE 1300 and different systems or devices, which need not necessarily be similar devices. For example, the subsystem 1340 may include an infrared device and associated circuits and components or a Bluetooth™ communication module to provide for communication with similarly enabled systems and devices. Subsystem 1340 may further include non-cellular communications such as WiFi or WiMAX, or near field communications, among others.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for cross-subframe scheduling at a user equipment comprising:
    defining a plurality of cross-scheduling search spaces, the plurality of cross-scheduling search spaces having starting Control Channel Element (CCE) indices distinct from starting CCE indices of existing search spaces;
    receiving a Radio Resource Control (RRC) message comprising an indication for a mapping between a search space and a subframe;
    detecting a Downlink Control Information (DCI) for the user equipment in the search space;
    determining a starting Control Channel Element (CCE) index of the search space;
    determining that the search space is a cross-scheduling search space from the plurality of cross-scheduling search spaces based on the starting CCE index of the search space;

mapping the starting CCE index to the subframe based on the indication wherein mapping includes associating the starting CCE index with the time for the subframe; and detecting the subframe on a frequency at a time associated with the subframe.

2. The method of claim 1, further comprising restricting a number of subframes capable of being scheduled to one.

3. The method of claim 1, further comprising expanding a search space.

4. The method of claim 3, wherein expanding the search space is used to support cross-subframe scheduling.

5. The method of claim 1, further comprising listening to a control channel for the subframe at a restricted location for subframe scheduling.

6. The method of claim 1, wherein mapping includes determining an offset of the index of the search space from an index for a search space for current subframe assignments.

7. The method of claim 1, wherein the index of the search space for downlink cross-subframe assignment is restricted to an odd number when an aggregation level is two, four or eight.

8. The method of claim 1, wherein the subframe is an inter-carrier subframe.

* * * * *